United States Patent [19]

Frankl

[11] Patent Number: 4,645,603
[45] Date of Patent: Feb. 24, 1987

[54] LIQUID AERATION DEVICE AND METHOD

[76] Inventor: Gerald P. Frankl, 187 McCook Lake, Jefferson, S. Dak. 57038

[21] Appl. No.: 568,367

[22] Filed: Jan. 5, 1984

Related U.S. Application Data

[63] Continuation-in-part of Ser. No. 849,965, Nov. 9, 1977, abandoned, and Ser. No. 673,797, Apr. 5, 1976, abandoned.

[51] Int. Cl.$^4$ .................. C01F 3/26; B03C 1/02; B01F 5/02
[52] U.S. Cl. .................. 210/629; 210/695; 210/195.1; 210/220; 210/223; 261/123; 261/DIG. 75
[58] Field of Search .................. 210/194, 195.1–195.4, 210/220, 221.1, 620, 629, 721, 695, 222, 223; 261/29, 36 R, 77, 123, DIG. 54, DIG. 75, DIG. 76

[56] References Cited

U.S. PATENT DOCUMENTS

| | | |
|---|---|---|
| 214,090 | 4/1879 | Bott . |
| 1,430,303 | 9/1922 | Hartman . |
| 1,574,783 | 3/1926 | Beth . |
| 1,885,012 | 10/1932 | Harvey .......................... 261/123 X |
| 2,479,403 | 8/1949 | Powers .......................... 210/629 |
| 2,538,340 | 1/1951 | Tomek et al. .................. 210/221.1 X |
| 2,582,198 | 1/1952 | Etheridge ...................... 261/77 X |
| 3,043,433 | 7/1962 | Singer .......................... 210/197 |
| 3,243,046 | 3/1966 | Kakumoto et al. ............. 210/199 |
| 3,306,449 | 2/1967 | Minegishi ...................... 210/195.3 X |
| 3,365,178 | 1/1968 | Bood ............................ 261/DIG. 75 |
| 3,414,248 | 12/1968 | Iwanaga et al. ................ 261/123 X |
| 3,441,502 | 4/1969 | Tenorio ......................... 210/222 X |
| 3,446,488 | 5/1969 | Mail et al. ..................... 261/77 |
| 3,452,966 | 7/1969 | Smolski ......................... 210/629 X |
| 3,671,022 | 6/1972 | Laird et al. .................... 261/DIG. 75 |
| 3,697,420 | 10/1972 | Blaisdell et al. ................ 210/222 X |
| 3,714,037 | 1/1973 | Almasi et al. .................. 210/223 X |
| 3,833,719 | 9/1974 | Kuerten et al. ................ 261/DIG. 75 |
| 3,846,292 | 11/1974 | Lecompte, Jr. ................. 210/220 X |
| 3,865,721 | 9/1975 | Kaelin .......................... 210/219 X |
| 3,936,376 | 2/1976 | Contineo ....................... 210/222 X |
| 3,968,086 | 7/1976 | Romanowski ................... 261/123 X |
| 3,998,741 | 12/1976 | Councell ....................... 210/222 |
| 4,152,259 | 5/1979 | Molvar .......................... 210/220 X |
| 4,155,959 | 5/1979 | Blum ............................ 210/220 X |
| 4,157,304 | 6/1979 | Molvar .......................... 210/220 |
| 4,206,052 | 6/1980 | Mandt ........................... 210/220 X |
| 4,242,289 | 12/1980 | Blum ............................ 210/220 X |
| 4,278,549 | 7/1981 | Abrams et al. ................. 210/222 X |
| 4,279,748 | 7/1981 | Inoue ........................... 210/222 |
| 4,289,621 | 9/1981 | O'Meara, Jr. ................... 210/222 |
| 4,299,700 | 11/1981 | Sanderson ...................... 210/222 |
| 4,303,504 | 12/1981 | Collins .......................... 210/222 X |
| 4,308,138 | 12/1981 | Woltman ....................... 210/220 |
| 4,390,423 | 6/1983 | Sundt ........................... 210/222 |

FOREIGN PATENT DOCUMENTS

| | | | |
|---|---|---|---|
| 452874 | 5/1913 | France .................. | 261/123 |
| 1377571 | 12/1964 | France .................. | 210/220 |

Primary Examiner—Robert Spitzer
Attorney, Agent, or Firm—John E. Reilly

[57] ABSTRACT

In the treatment of livestock waste, liquid to be aerated is pumped from a storage container, holding pond or lagoon and drawn through a magnetic air inductor inlet then pumped into a conical chamber towards an outlet port at the narrow end of each of a series of conical chambers. Air is drawn into the chamber by pressure differential and intermingled with the liquid and waste to be treated to hydrolyze the fines as the material passes through the chambers. A conically shaped expansion cone attached as an extension of each chamber outlet port permits further expansion and intermingling of the air and liquid waste mixture. An open-ended sleeve is attached in surrounding relation to the outlet of each discharge cone so that the air/liquid stream from each cone is directed axially through its sleeve, each sleeve having a spiral baffle plate extending along the interior length thereof to further promote agitation of the mixture and most complete aerobic digestion of the fines.

5 Claims, 11 Drawing Figures

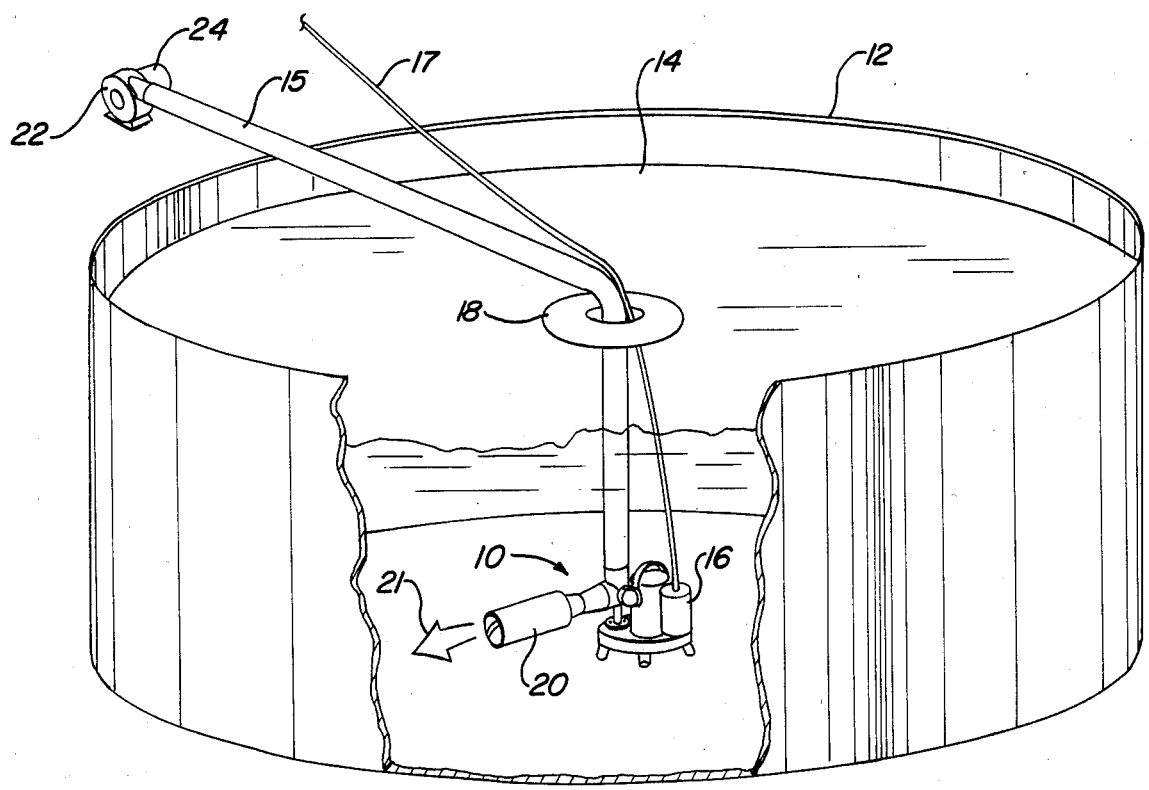
Fig _ 1
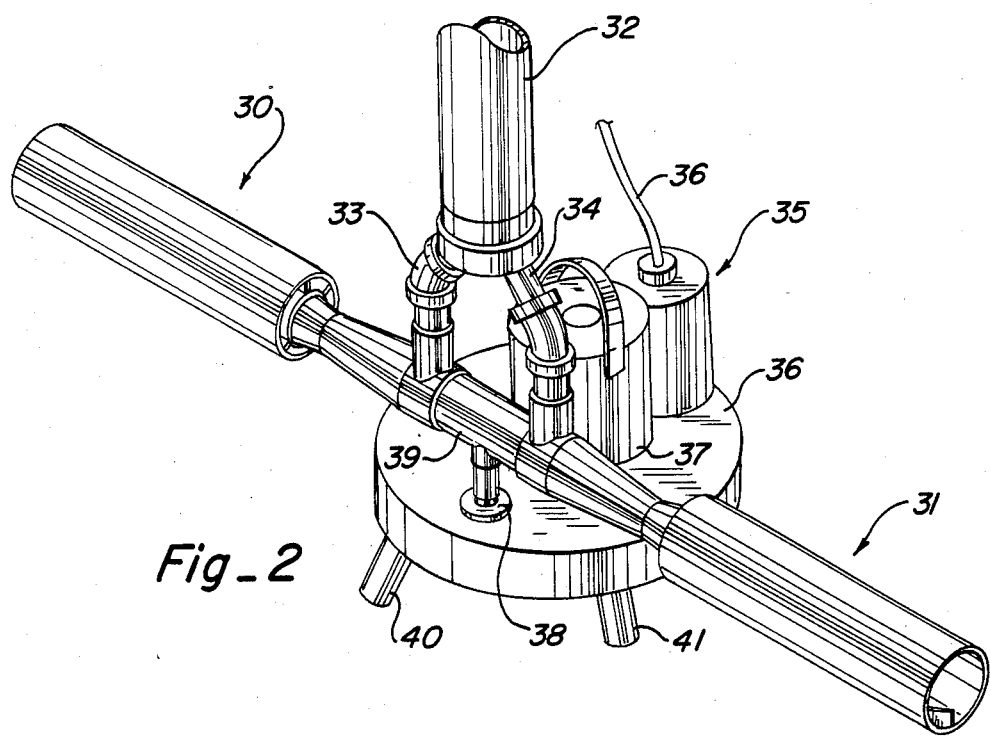
Fig _ 2

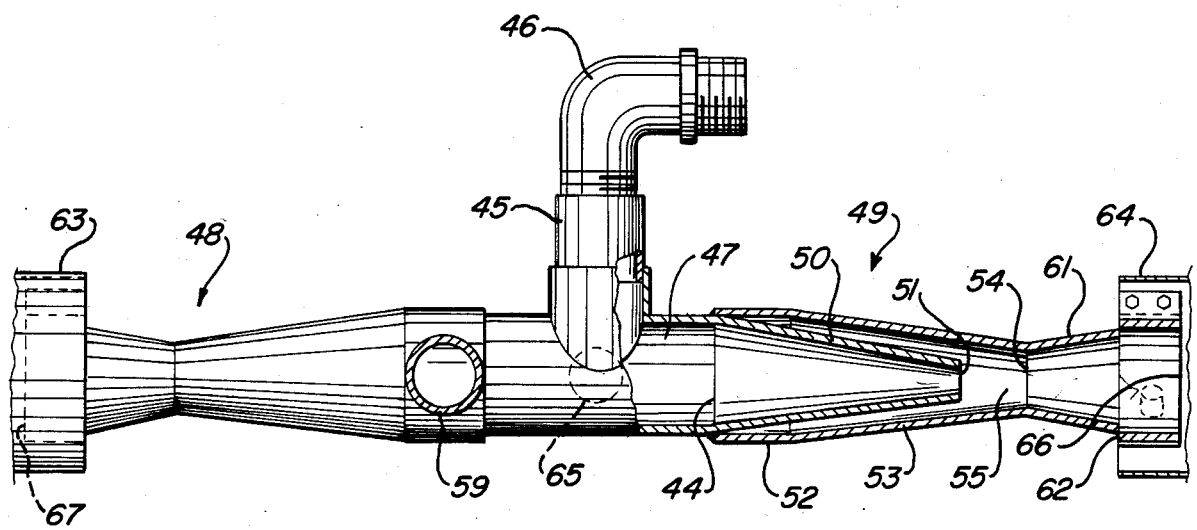
Fig_3
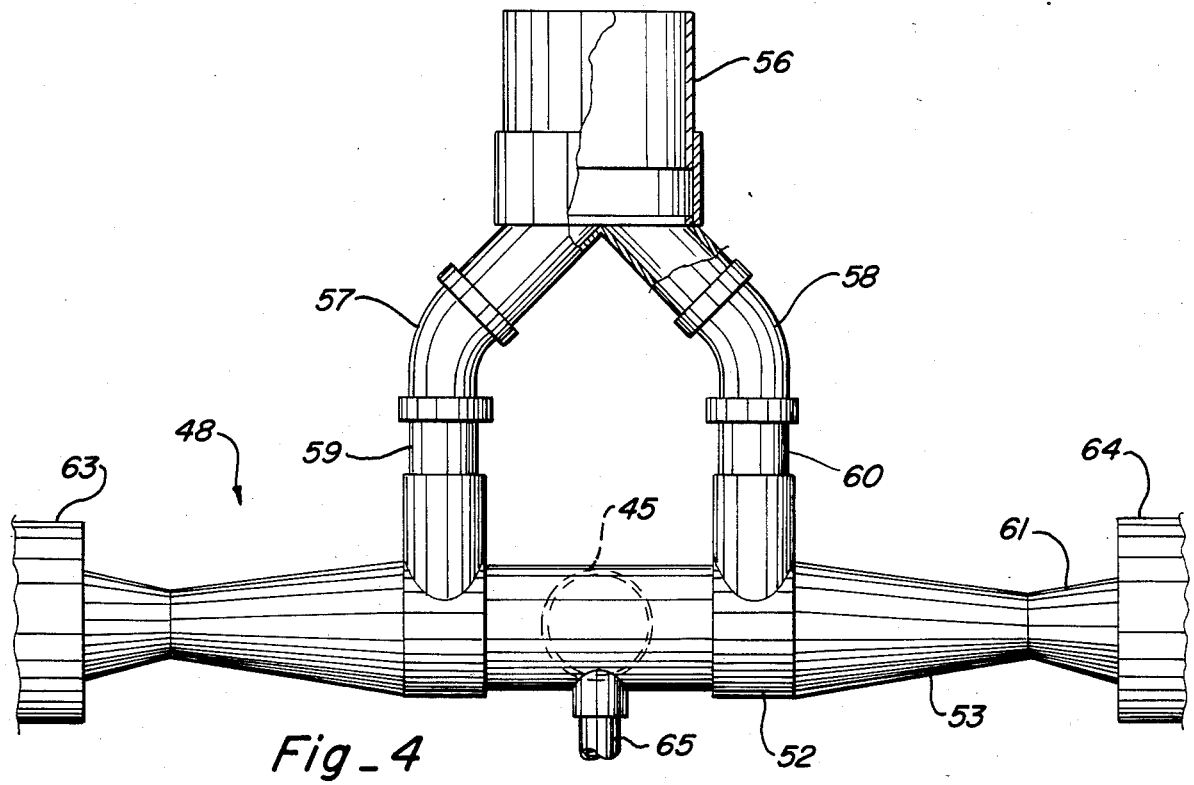
Fig_4

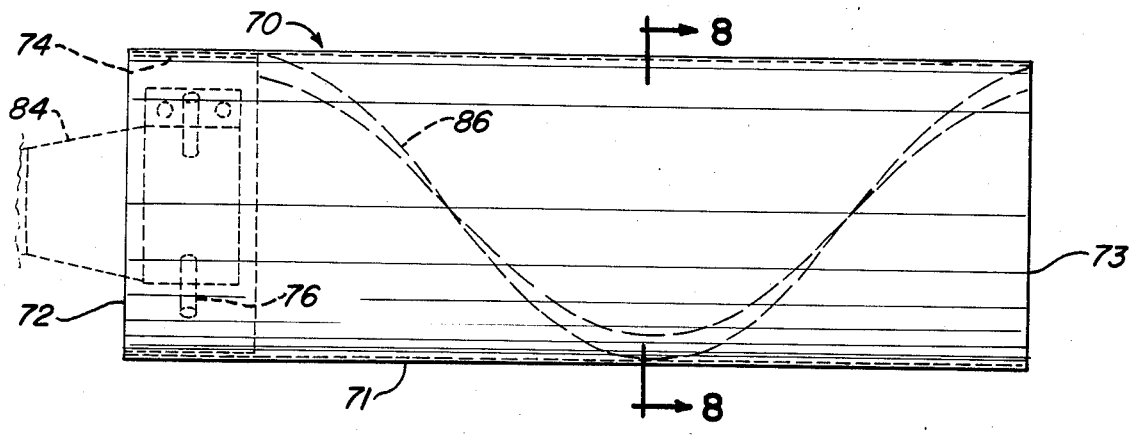
Fig_5
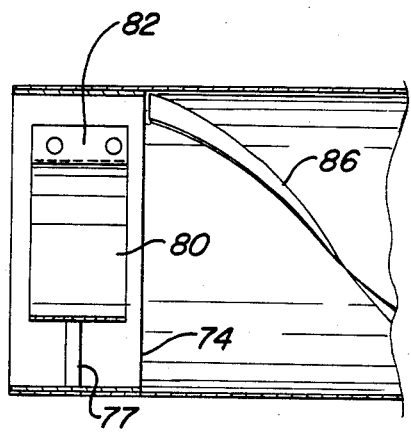
Fig_7
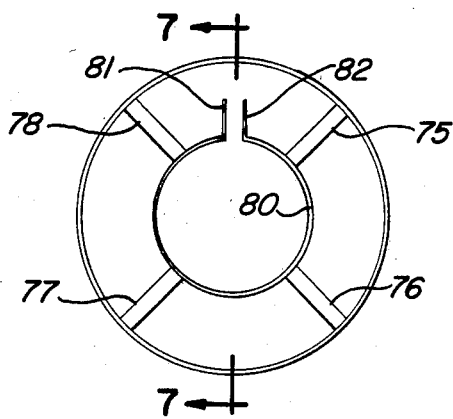
Fig_6
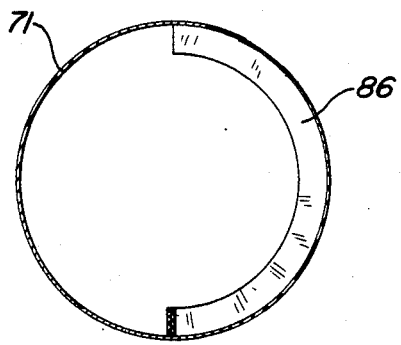
Fig_8

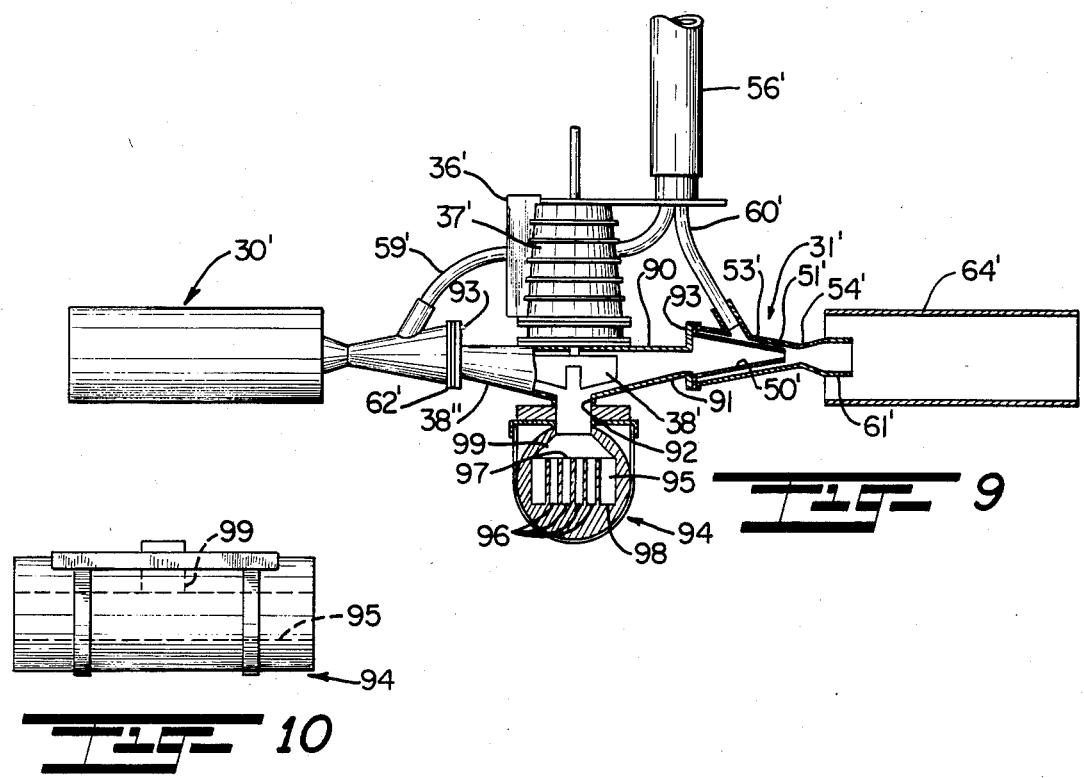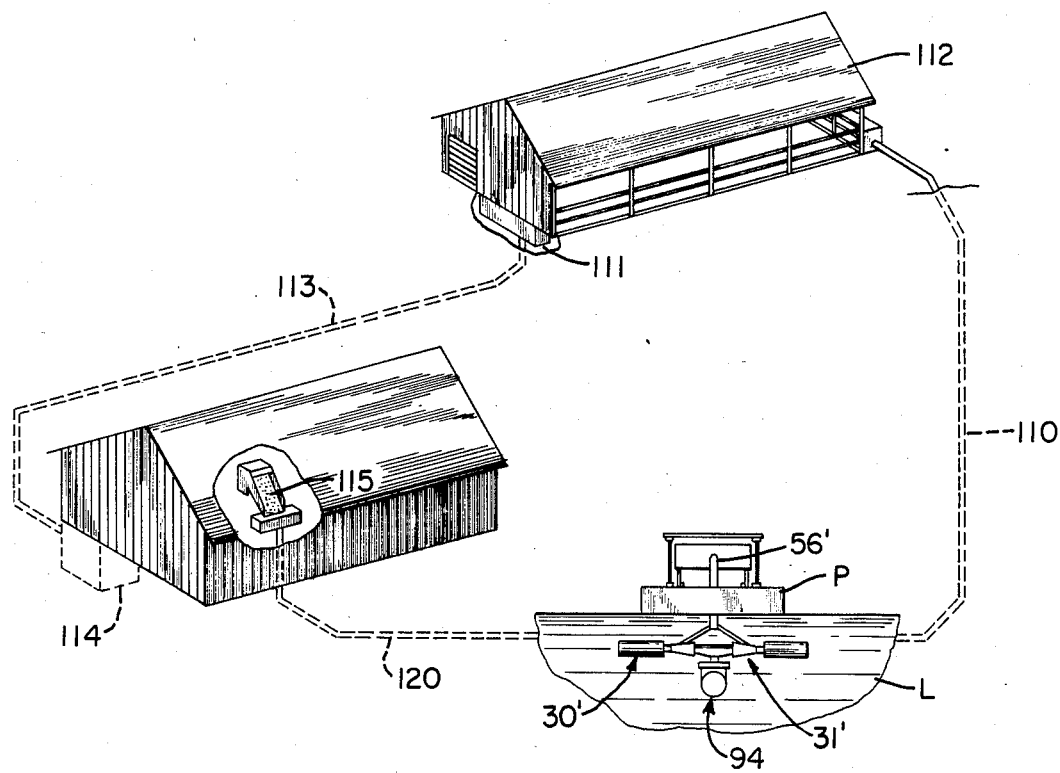

LIQUID AERATION DEVICE AND METHOD

This application is a continuation-in-part of Ser. No. 849,965, filed 9 Nov. 1977, and Ser. No. 673,797, filed 5 Apr., 1976, both entitled LIQUID AERATION DEVICE AND METHOD both prior applications now abandoned.

CROSS-REFERENCE TO RELATED PATENTS

U.S. Pat. No. 3,892,499, entitled CONVERSION OF ANIMAL WASTE, and 4,338,337 entitled METHOD FOR RECOVERING AND RECYCLING ANIMAL WASTE MATERIALS, by Gerald P. Frankl, are directed to system environments in which the present invention is particularly useful.

SPECIFICATION

This invention relates to novel and improved methods and apparatus for livestock waste treatment and the recovery of useful feed values therefrom. More particularly, the present invention relates to apparatus and methods of aerating liquids in livestock waste treatment systems and is particularly useful for storage containers or holding ponds requiring reduction of biological oxygen demand (BOD) and hydrolization of fines in waste treatment facilities.

BACKGROUND AND FIELD OF THE INVENTION

The prior art devices adapted for use in aeration of waste materials have predominantly employed spargers, such as, perforated pipe and the like for releasing the oxygen bearing gas in the bottom of the storage tank or holding pond. The dispersion of the released gases from the sparger occasionally is further agitated by rotating vanes or multiple level baffles within the storage tank. For example, an arrangement for introducing the oxygen bearing gas in line with a propeller agitator is shown in U.S. Pat. No. 3,865,721 to Kaelin. Other efforts to directly agitate a fluid by releasing pressurized gas below the fluid surface and into flow directing columns are shown in U.S. Pat. Nos. 1,574,783 to Beth, 3,043,433 to Singer and 3,446,488 to Mail et al.

It has also been known for some time to use a pressure differential injector for drawing gas into a liquid stream as is shown in U.S. Pat. No. 1,430,303 to Hartman while similar such injector/mixer apparatus for other applications are shown in U.S. Pat. Nos. 3,243,046 to Kakumoto et al and 214,090 to Bott. Although specifically concerned with steam condensation, the device of Bott includes a spiral ridge arrangement within the outlet horn. Other patents of interest are U.S. Pat. Nos. 2,479,403 to Powers, 3,306,449 to Minigishi, 3,833,719 to Kuerten et al, 3,671,022 to Laird et al, and French Pat. No. 452,874.

The use of spargers and other devices in oxygenation of wastes generally recognizes that a larger bubble which tends to rise rapidly to the surface of the liquid expels much of its liquid treating contents (usually oxygen) uselessly into the atmosphere. Thus it is important that the gas be reduced to bubbles of the smallest possible size prior to release thereby permitting a higher percentage of the oxygen content within the bubbles to be transferred into the liquid. In providing oxygen for an aerobic system, air flow as is generally measured in cubic feet per minute (cfm) is highly important as it requires approxiamtely 65 cubic feet of air for each pound of oxygen. A traditional rule of thumb relative to mechanical areation systems is that two pounds of dissolved oxygen (DO) per horsepower hour is the expected level of recovery through such prior art systems and the economic penalty for aerobic digestion of wastes generally has increased as power costs have increased. Further, the power requirements to overcome the hydraulic head of relatively deep containers or storage ponds, such as, up to a depth of about 20 feet often pose further economic disadvantage for the prior art diffuser systems. Venturi-type devices for intermingling of gases and fluids, such as, Minigishi have been more for the purpose of agitation accomplished by release of the air bubbles at the surface and have not been accepted for meeting the continuous emulsification and large volume mixing demanded by waste treatment facilities.

Accordingly, there has been a continuing need for economic and efficient methods and apparatus of gas/fluid intermingling adequate to meet the demands for odor control as in the use of anaerobic ponds and especially to meet the stringent regulations concerning effluence entering rivers and streams. In this same relation, it has been recognized that magnesium phosphate deposition on metal surfaces is a particular problem in the course of recycling anaerobic liquid from animal waste treatment lagoons; and, if not properly controlled, there is a tendency for the particles to collect and form a scale on the pump impeller and other surfaces through which the liquid is directed so as to impose severe limitations on the life of the equipment and to some extent affect the quality of digestible protein recovered. Various magnetic and electromagnetic collectors have been employed either alone or in connection with chemical flocculating agents to remove metallic or mineral particles in liquids but none devised for use in association with a pump impeller or submersible inductor assembly so as to create a magnetic field across an inlet passage for the removal of particles from animal waste material so as to enhance the efficiency and performance of the inductor assembly in the aerobic digestion of fines in the material and conversion into single cell protein. Representative patents of interest are U.S. Pat. Nos. 3,697,420 to D. S. Blaisdell et al; 3,714,037 to G. C. Almasi et al; 3,936,376 to P. Centineo; 3,998,741 to G. D. Councell; 4,278,549 to J. L. Abrams et al; 4,279,748 to K. Inoue; 4,289,621 to J. R. O'Meara, Jr.; and 4,299,700 to C. H. Sanderson.

SUMMARY OF THE INVENTION

In the present invention, improved submersible magnetic air inductor method and apparatus have been devised for effectively intermingling air or oxygen-augmented gases with a liquid or liquids and solids present in livestock waste treatment facilities in such a way as to render more efficient the hydrolization of fines and aerobic digestion of the single cell protein into the waste. The present invention employs a vacuum principle below the surface of the liquid so that the air is motivated in a manner which does not require the energy to overcome head pressure normally encountered in transferring the air below the surface of the liquid. The air is impregnated and emulsified with the liquid being pumped and discharged into the container or pond. The air is motivated through the liquid in a manner which effects greater volumes of intermingling than available with the prior art devices, the air being broken into fine particles so as to increase the exposed surface thereof relative to the liquid for a given quantity of air. Further, the invention is particularly useful for a relatively wide range of liquid depths, such as, five to twenty feet below the surface through a submersible pump forcing liquid into a vacuum-creating mixing chamber in association with the air. This minimizes the horsepower normally required to overcome head pressures at these depths. The gas which can be air at atmospheric pressure can be introduced unaugmented into the submerged mixing apparatus or can be supplemented by relatively lower power air pumps capable of applying four to ten inches of static pressure on the air conduit.

In one form of air and liquid intermingling apparatus, an injector assembly includes a hollow conical member which has opposed wide and narrow open ends with the wide end receiving pressurized liquid for discharge as a stream from the narrow end. The injector assembly also includes a second conical member which is preferably formed as a shroud completely enclosing the first conical member and is mounted in coaxial relation to the first conical member but with its narrow end parallel with but axially spaced from the narrow end of the inner conical member. Thus, the gas is introduced into surrounding relation to the discharge stream as it expands upon exiting from the first member. That is, the space between the narrow open ends in conjunction with the conical member forms a mixing chamber for the gas and liquid. By dimensioning the second member narrow end about twice the size of the first member narrow end, expansion of the liquid discharge stream is assured thus effecting motivation of the gas into intermingled relation for further discharge with the liquid. The injector assembly also includes a third hollow conical member with its narrow end attached to the second member narrow end for forming an axially aligned but outwardly directed expansion chamber or diffuser.

In another form of invention, a submersible induction assembly has a common impeller which draws the liquid and solid waste mixture through an inlet passage in which a magnetic field is established to effectively precipitate and remove metallic particles from the wastes which otherwise tend to form scale within the impeller and inductor sections. The impeller discharges the wastes through one or more Venturi-shaped inductors which radiate outwardly from the common impeller and at a flow capacity to generate a negative pressure condition which will encourage the intermixture of the air with stream of wastes from the liquid storage container for complete intermingling together. The air bubbles formed are further divided and retained in the mixture by passing the stream through enlarged, horizontally directed agitator or mixer sleeves defining outward radial extensions of the inductors. A region of reduced pressure formed at the entrance to each sleeve and in open communication with the sleeve interior causes a recirculatory movement of the aerated stream discharged by each sleeve so as to encourage the retention and entrainment of bubbles within the stream and thereby realize maximum aerobic digestion and hydrolization of the solid fines carried in the waste material. This aerated material is then recycled through a waste confinement facility for admixture with additional wastes, such as, a hog barn. The resultant mixture then undergoes separation by removal or separation of the moisture and selected fines containing the digestible protein nutrients which are delivered back into the waste material lagoon or pond. The solid waste materials and retained moisture not separated are collected and stored for use as feed values in accordance with the teachings of my hereinbefore referenced U.S. Pat. No. 4,338,337.

An additional and advantageous feature of this invention relates to the mixer sleeve or spiral diffuser which allows large amounts of air to be drawn from the surface to be impregnated, emulsified and mixed with a large volume of water drawn through that sleeve. Preferably, an elongated hollow sleeve which is open at each end is mounted so that the injector outlet stream is directed into the sleeve interior from one end and with the end of the sleeve around the injector outlet being in open communication with the sleeve interior around at least a portion of the periphery of the injector. This permits passage of liquid from the storage container or pond into the sleeve interior from the injector mounting end of the sleeve. Accordingly, the liquid is drawn into the interior of the sleeve by the injector outlet stream and the air is intermingled with the liquid during passage through the sleeve.

By the unique apparatus and method of the present invention, 75 pounds to 100 pounds of DO per hp hour is possible. Accordingly, the invention is economically attractive for oxygenation or treatment of anaerobic ponds and the like. It is likewise possible to attach a series of the vacuum motivating mixers and/or mixer tubes from common manifolds of hydraulic pressure and/or air chambers. Embodiments of the present invention have been shown to be capable of performing 10% better than existing sparger devices with one-third or less power requirements.

It is therefore an object of the present invention to provide for novel and improved apparatus and methods for obtaining maximum intermingling of air bubbles within a relatively large volume of liquid.

It is another object of the present invention to provide a novel and improved apparatus and method for efficiently aerating a liquid in a container, storage pond or the like with minimal power demands.

It is a further object of the present invention to provide for a novel and improved magnetic air inductor assembly for use in a waste treatment lagoon which will inhibit the formation of scale in the assembly while maximizing the oxygenation of waste containing liquids so as to encourage the retention and entrainment of bubbles within the liquid and thereby realize maximum aerobic digestion and hydrolization of solid fines carried in the waste as a preliminary to recycling of the aerated material through a waste confinement facility for admixture with additional wastes and subsequent separation by removal of moisture and selected fines from the wastes and returned in the form of digestible protein nutrients back into the waste treatment lagoon.

Yet another object of the present invention is to provide for novel and improved methods and apparatus for maximizing emulsification of gas containing liquid treating elements into a liquid at locations below the liquid surface in a manner which requires minimal power for communicating with the gas to the point of emulsification with minimum or no gas augmenting power requirements.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a perspective and partially broken view of a single ended aeration device in accordance with this invention in use in a tank;

FIG. 2 is a perspective view of a double-ended version of the present invention in association with a submersible pump;

FIG. 3 is a top partially broken and sectioned view of a double-ended embodiment of this invention somewhat similar to FIG. 2;

FIG. 4 is a side partially broken and section view of the FIG. 3 embodiment;

FIG. 5 is a side view of a diffuser tube in accordance with the present invention;

FIG. 6 is an end view of the FIG. 5 diffuser tube;

FIG. 7 is a partially broken and sectioned view taken along lines 7—7 of FIG. 6;

FIG. 8 is a section view taken along lines 8—8 of FIG. 5;

FIG. 9 is a view partially in section of a modified form of submersible air inductor assembly in accordance with the present invention;

FIG. 10 is a view in detail of the magnetic intake sleeve employed in the form of invention shown in FIG. 9; and FIG. 11 is a diagrammatic view of the assembly illustrated in FIG. 9 employed in a waste recovery process.

DETAILED DESCRIPTION OF THE PREFERRED EMBODIMENT

Referring in more detail to the drawings, in the perspective view of FIG. 1 an aeration device 10 in accordance with the present invention is shown submerged within a storage tank 12 containing a liquid 14 which might typically be water containing elements requiring treatment including suspended solids. Although a tank 12 is shown for illustration purposes, it will be readily recognized that the present invention is equally well suited for use with the liquid storage environment, such as, holding ponds, lagoons or the like and can even be employed in a moving liquid environment as in canals, streams or other environments. The present invention is particularly useful for efficient livestock, poultry or municipal waste oxidizing. Thus, it finds application for large swine operations wherein the swine waste is periodically flushed from a barn by pumping liquid from a treated lagoon, storage tank or the like through the barn and returning the waste back into the storage container where it is treated aerobically by the present invention. In conjunction with poultry waste treatment, large volumes of volatile ammonia-type nitrogen can be converted into nitrates by the present invention wherein the nitrogen is stable and odorless for use as a fertilizer. Ammonia conversion to nitrates generally requires approximately 4.57 pounds of DO per pound of ammonia. For municipal waste treatment facilities, the present invention is particularly useful from a standpoint of BOD, suspended solids and grease flotation requirements.

The embodiment shown in FIG. 1 includes a single-ended aeration assembly 10 which is coupled to be provided with air via a conventional flexible but circumferentially rigid hose 15. The aeration device is primarily motivated by a submersible pump 16 which is electricaly powered via cable 17. For convenience, submersible pump 16 is shown resting directly upon the bottom of tank 12 although with hose 15 and cable 17 being generally retained in a generally vertical position by a flotation device 18. Pump 16 withdraws liquid from its immediate environment and introduces it into a vacuum generating injector arrangement generally similar to that which will be described subsequently for one end of the FIG. 3 embodiment and injects this pressurized fluid into an outlet orifice which is directed generally coaxially into mixer tube or sleeve 20. As will be more readily apparent from the subsequent description, the outflow 21 from the aerator will contain fine particles of air bubbles which maximizes the oxygenation of the material within the tank 12 as these bubbles rise to the surface of liquid 14. Although the present invention will operate satisfactorily for many purposes with hose 15 merely vented to the atmosphere, it has been found that the efficiency can be further increased by a blower 22 which is powered by a low horsepower drive motor 24 to increase the air pressure within hose 15. The air introduced to hose 15 can be air drawn directly from the atmosphere or can be oxygen supplemented, such as, by ozone or aran generators. Submersion pump 16 can be suspended at any level within tank 12 and can obviously be positioned to augment rotary churning of the contents of tank 12 if desired. Further, pump 16 can be mechanically motivated from the surface as is generally shown in said U.S. Pat. No. 3,892,499 cross-referenced above, or by any of various known alternatives.

FIG. 2 shows a perspective view of a double-ended aeration device in accordance with the present invention wherein a pair of aeration assemblies 30 and 31 are arranged in back-to-back configuration. Air, oxygen, ozone, aran or any suitable gas depending upon the treatment to be effected in the liquid is introduced to the aeration assemblies 30 and 31 via common coupling 32 to pipe connections 33 and 34 as is shown in somewhat greater detail in FIG. 4.

Submersible pump 35, electrically powered via cable 36, is a heavy duty pump with the impeller contained within housing 36 and directly attached to the output shaft of drive motor 37. The impeller in housing 36 drives liquid drawn from the environment of pump assembly 35 into outlet connection 38 for common motivation coupling to both aeration assemblies 30 and 31. As will be more fully appreciated from the detailed description of a similar double-ended aeration version as shown in FIGS. 3 and 4, the liquid under pressure is split in common portion 39 and directed outwardly into aeration assemblies 30 and 31 for mixing with the gas communicated through connectors 33 and 34.

A typical conventionally available submersible pump useful in conjunction with a double-ended aerator using a 1.25 inch inner cone orifice is a Model SE 151 1.5 hp Peabody Barnes pump. This pump is equipped with ceramic seals as well as secondary exclusion seals to retain oil. The ceramic and carbon seals withstand the acids and gases characteristic of waste materials being aerated. The motor 37 output shaft is typically stainless steel for the same reason and corrosion resistant materials are generally employed throughout. The intake for pump 35 is typically from below the impeller housing 36 and thus support legs, such as, 40 and 41 are employed if the pump assmebly 35 is to be positioned on the bottom of the storage pond or tank or the like.

The double-ended embodiment of the present invention shown in FIGS. 3 and 4 is internally identical to the FIG. 2 device. FIG. 3, a top plan view of this embodiment, shows input connection 45 adapted for attachment to a submersible pump similar to that mentioned hereinbefore as via elbow connector 46. Thus, liquid under pressure is commonly introduced to splitter chamber 47 wherein it is directed into aeration assemblies 48 and 49. The pressurized liquid is introduced to a nozzle, such as, 50 formed as a segment of a cone so that the fluid is discharged through the port or orifice formed at the narrow end 51 thereof. Inner cone 50 is preferably formed to produce a flow velocity increase and resulting pressure decrease along its length as by maintaining the diameter of the opening 44 at the wide end about four times the diameter of the narrow end opening 51. Preferably, cone 50 should be of as long an axial length as possible, an axial length of about eight times the diameter of orifice 51 having been formed to be suitable for this purpose.

Inner cone 50 is shown completely surrounded by a shroud assembly including a cylindrical portion 52 and an outer conical portion 53 formed as a continuation of cylinder portion 52. Outer cone 53 terminates in an outlet port 54 at the narrow end thereof in spaced relation to port 51 so as to define an intermediate mixing chamber 55. The high velocity liquid flow discharging from port 51 into chamber 55 tends to expand and decrease in velocity so as to draw the air into intermingled relation therewith. The shroud assembly completely surrounds cone 50 so as to isolate chamber 55 from the environment as is needed when the device is further submerged. However, only the terminal portion of conical section 53 need be included around port 54 if the device is operating so that the exterior environment is air or some other form of gas containing enclosure.

FIG. 4 shows the means for charging the space between inner cone 50 and outer cone 53 with air wherein a conduit 56 is commonly coupled to connectors 57 and 58 which are thence attached to nipples 59 and 60. Thus, the air present in hose or conduit pipe 56 is in open communication with the space between cones 50 and 53 so that discharge of the liquid from port 51 into chamber 55 effects a venturi-like gas motivation into mixer chamber 55. Note further that port 54 is dimensioned larger than port 51 so that the pressurized liquid discharged from cone 50 tends to expand and slow somewhat as it passes through chamber 55 thereby providing both withdrawal of air from pipe 56 and intermingling with the liquid at an initial stage. The distance between the discharge end 54 and orifice 51 created by the air chamber column correlated with the difference in size of orifices 51 and 54 accommodates the flow of liquids from inner cone 50 which slows down and expands to fill outer orifice 54 and in passing through outer orifice 54 creates a vacuum for withdrawing the air or other gas from the space between cones 50 and 53. Each aerator assembly 48 and 49 termiantes in a somewhat bell-shaped cone or horn, such as, 61 extending from port 54. Cone 61 is flared outwardly to allow the stream discharged therein to continue expanding and further slow until it reaches the flange collar 62 to which the mixer tube, such as, 63 and 64 are attached and as will be described in greater detail for FIGS. 5-8. This arrangement allows a maximum force of the liquid being pumped from the vacuum aeration devices 48 and 49 to be exerted in the center of the mixer tubes 63 and 64 causing a maximum amount of circulation and pumping action through these mixer tubes thereby emulsifying the air and mixing it with an increased and larger volume of liquid. The embodiment of FIGS. 3 and 4 is further adapted for attachment to a support (not shown) as by stanchion 65 in the event that the submersion pump does not provide sufficient mechanical support.

A typical mixer tube or spiral baffle 70 useful in conjunction with the present invention is illustrated in FIGS. 5-8. Although shown as an attachment to a vacuum pump apparatus as discussed above, it will be recognized that the tube 70 can be used in shallow flows without the specific vacuum pump apparatus by merely discharging high volumes of air coaxially into the center of tube 70. That is, air under ten inches of static pressure which can be provided by a 5 hp motor can be sufficient for air-to-liquid intermixing with the sleeve-type mixer tube 70 for depths of a few feet. Such a pressure is adequate for creating a hydraulic pumping action moving large volumes of liquid through mixer tube 70 so as to emulsify and mix this air with large volumes of water.

Mixer tube 70 is formed with an elongated cylindrical sleeve 71 which is open at both ends 72 and 73. Attached in proximity to end 72 is a collar 74 which positions a plurality of radial posts 75-78 which further position clamping collar 80 in a generally centered relation within end 72 of cylindrical sidewall 71. Collar 80 has radially projecting ears 81 and 82 thereon adapted to be flexed in gripping relation by bolts or the like (not shown). Thus, a vacuum discharge nozzle such as is shown in FIG. 5 can be gripped and retained in coaxial discharge relation relative to the interior of cylindrical sleeve 71.

An elongated plate 86 is formed as a generally radial extension from the interior wall of cylinder 71 and formed in spiraled relation as is illustrated in FIGS. 5, 7 and 8 so as to effectively form a single complete revolution around the inner sidewall of cylinder 71 throughout its length. Accordingly, it can be seen that fluid is drawn through the open end 72 into the interior of mixer tube 70 via the motivating stream from nozzle 84. The mixture of this fluid and the gas from nozzle 84 is thoroughly emulsified by the churning action of flange plate 86 as it passes through the length of tube 71. The discharge from outlet end 73 will contain a thorough mixture of fine gas particles which is ideal for aeration or oxygenation purposes.

The diameter of mixer tube 70 depends upon the viscosity of the liquid to be aerated and the apparatus employed to propel air into it. As a general guideline, the diameter of tube 70 waste water treatment can be selected according to the following: For water containing no more than 2% solids—8.0 inch diameter; for water with roughly between 2% and 4% solids—10.0 inch diameter; and for water containing greater than 4% solids—12.0 inch diameter. The axial length of tube 70 is preferably as long as possible but not long enough to create back pressure which reduces the liquid flow from the stream producing device. Thus, for an 8.0 inch diameter sleeve 71, a length of two feet has been found experimentally to be optimum for most applications and is also considered to be a satisfactory length for the larger diameter.

In use for a typical installation employing a double-ended embodiment, the conical vacuum mixer assemblies are attached to a submersible pump and an air hose coupled to the divider chamber. The thus assembled elements are either lowered to a preselected depth in suspension within the liquid to be aerated or allowed to descend to the floor of the container. The submersible pump is then energized so as to pressurize fluid from the container for injection as a stream into the conically shaped mixing chambers and towards the outlets thereof. The gas containing elements intended for interaction with the liquid is coupled as via the air hose either with atmospheric pressure or with relatively light pressure augmentation. The fluid stream is expanded as it discharges into the conical mixing chamber to provide an initial intermixing with the gas. The discharge stream is then introduced into the elongated, open-ended diffuser tube where additional liquid is introduced for further intermixing with the discharge gas. By confining the outlet flow through the length of the mixer tube and further by spiraling this flow, an even more thorough and efficient gas-to-liquid intermixing is effected. Typically, the submersible pump is allowed to operate for extended periods, it having been found that a storage tank for flushing a confinement feeding barn for livestock can be sufficiently aerated by continuous operation of the pump so that the liquid contents can be employed for flushing of the confinement area on a regular basis, such as, once each day.

In a typical double-ended mixer in accordance with the present invention and as is shown in FIGS. 3 and 4, the overall length between the outlet discharge openings (i.e., 66 and 67) is about thirty-eight inches with the discharge openings 66 and 67 being each 4.0 inches, the mounting collar 62 having an axial length of 2.0 inches, the bell-shaped expansion cone 61 having an axial length of 3.0 inches. Port 54 is axially spaced from outlet 51 by 2.0 inches and, for one model, has a diameter of 2.0 inches for a 1.25 inch diameter of outlet 51 whereas, for yet another model, orifice 54 has a 1.75 inch diameter for a 1.0 inch diameter of outlet 51. Cylindrical sleeve portion 52 of the outer shroud is typically 3.25 inches in length and the wide end of the inner cone 50 is typically 4.0 inches in diameter. The overall length for the outer shroud up to port 54 is 10.0 inches while the axial length of the inner cone 50 is 8.0 inches. The splitter chamber 47 is typically about 8.0 inches in axial length and coupled through a 3.0 inch diameter connection through fitting 45 to a 1.5 hp Peabody Barnes submersible pump when outlet 51 is a 1.25 inch diameter or a 0.5 hp to 0.75 hp pump when outlet 51 is 1.0 inches in diameter. A 6.0 inch air hose 56 is employed and couples into 2.50 inch diameter air connectors 59 and 60. The inner surface of the inner cones is preferably a hard surface, the elements of the vacuum mixers are predominantly formed of 0.25 inch HR stainless steel.

A typical mixer sleeve 70 is formed from 18 gauge stainless steel with an overall length between openings sufficient to insure confinement of the discharge stream without significant back pressure, a length of 24.0 inches having been found experimentally to be satisfactory in this regard. The mounting flexible collar 80 probably has a minimal 4.0 inch inside opening and a 0.5 inch spacing between 1.0 inch clamping ears 81 and 82. The inner collar 74 is likewise of 18 gauge stainless steel (as is collar 80) but with an axial length of 3.50 inches and with 0.375 inch diameter spacer rods 75–78. The diameter of cylinder 71 is selected in accordance with the liquid viscosity and solids content as discussed previously with a 4.0 inch diameter outlet centered therein via clamping collar 80 so that a 2.0 inch radial spacing is maintained around the entire outer periphery of the discharge stream producing outlet. The spiral fliting or flange plate 86 is of 18 gauge steel with a radial extension into the interior of cylinder 71 typically between 0.25 and 1.0 inches depending upon the diameter of tube 71. The radially inward projection of plate 86 is selected so as to develop a rotational churning effect on the discharge stream but without introducing any significant back pressure to the discharge stream producing apparatus. It has been found experimentally that a radial inward extension of 0.625 inches can be used for an 8.0 inch diameter of tube 71 and 0.75 inches for a 10.0 inch tube. Thus, it is believed that an ideal ratio of radial inward height of plate 86 to the diameter of tube 71 is in the range of 0.07 to 0.08. Using models dimensioned as discussed, better than 25 pounds of DO per hp hour is possible with up to 20 feet in depth for oxygenation of waste materials.

Using an atmospherically vented hose rather than with any pressure augmentation of the air, approximately 50% of the air capacity for mixing can be obtained with the double-coned vacuum mixers and mixing tubes. However, a blower, such as, 22 in FIG. 1 made of a 16 gauge housing and with balanced, self-spinning paddle-type wheels powered by between a ⅓ hp and 1 hp motor, the volume of air and liquid mixing is significantly enhanced. A typical such blower has an air inlet of five to six inches in diameter as a flanged opening in the housing in the center of the paddle-type wheel. The wheel is 10.625 inches in diameter with paddles 2.5 inches wide mounted directly on the shafts of the motor. A 1 hp motor at 3450 rpm delivers 370 cfm with six inches of static pressure. The size of the motor used on the fan can be varied to fit various applications and depths of aerator placement. A ⅓ hp motor at 3450 rpm with such a blower typically delivers 335 cfm with four inches of static pressure.

Although single and double-ended embodiments of the vacuum aerator assemblies have been shown and described, it will be recognized that a plurality of such aerators can be extended from a common manifold energized by a single pump and receiving air individually from a manifolded air chamber charged with a single blower. In an experimental research application for a municipal sewage treatment plant, four double-ended vacuum aerators each powered by a 1.5 hp submersible pump were all charged from a single 3 hp blower. These four aerators using less than 10 hp total power were assigned 25% of the sewage treatment for that municipality. The contemporary municipal equipment for the other 75% of the municipal sewage required 100 hp of power. Despite the fact that less than ⅓ of the energy requirements were demanded by the aerators in accordance with this invention, a significant improvement in resulting reduction of grease content, suspended solids and BOD were obtained through the present invention as contrasted to the contemporary equipment and further despite the fact that approximately 11.3% greater flow was handled through the channels employed with the present invention as contrasted to the average flow of the other canals. The confinement area flushing mentioned between page 16, line 30 and page 17, line 4 hereof can be via intermittent flushing of limited quantities from the storage tank throughout the day or can be "surge" flushing (i.e., once per day) of greater quantities from the storage tank.

DESCRIPTION OF ALTERNATIVE EMBODIMENT

Referring to FIGS. 9 and 10, a modified form of aeration assembly similar to that illustrated in FIGS. 2 to 4 has a pair of aeration assemblies 30' and 31' arranged in diametrically opposed relation to one another at the discharge of a submersible pump 36' which includes common impeller 38' within the housing 38" and driven by a motor 37' mounted on the impeller housing 38". Thus, as opposed to directing liquid discharged by the impeller 38' through an intermediate splitter chamber into the aeration assemblies as in the form of FIGS. 2 to 4, the aeration assemblies are joined directly to the impeller housing 38". Here, the housing 38" is characterized by being of open, generally cylindrical configuration and, in cross-section, has an upper flat horizontal wall portion 90 and a lower generally bowl-shaped wall portion 91 which inclines upwardly and radially outwardly from a common central inlet 92 directly beneath the impeller 38'. Thus, the wall portions 90 and 91 effectively converge toward one another in a radially outward direction and terminate in diametrically opposed flanges 93 to facilitate attachment of the aeration assemblies 30' and 31' thereto in a manner to be described.

An important feature of the alternate form of invention resides in the manner in which liquid is drawn from the storage tank or waste treatment lagoon, not shown, through a magnetic field into the impeller housing whereby to cause agglomeration or precipitation of magnetizable particles in the liquid, such as, mineral or metallic elements which are commonly entrained in liquid animal waste material. To this end, an elongated, open-ended, generally cylindrical sleeve 94 defines an inlet passage 95 extending parallel to the longitudinal axis of the sleeve, the passage being of generally rectagular cross-sectional configuration and having disposed therein a plurality of longitudinally extending, spaced plates 96. The sleeve is relatively thick-walled, and the inlet passage 95 has top and bottom horizontal surfaces 97 and 98 with the spaced magnetic plates 96 positioned on edge intermediately across the passage with opposite edges of the plates permanently affixed to the top and bottom surfaces 97 and 98. Opposite sides of the passage 95 which flank the plate members 96 communicate with inclined passageways 99 which converge upwardly into the central inlet 92. Further, the central inlet 92 extends vertically through the upper wall of the inlet sleeve 94 to communicate at the center of the sleeve 94 with the inlet passage 95.

The magnetic plates are arranged such that opposed vertical flat surfaces of each plate are of opposite polarity. Thus, the confronting or facing surfaces of adjacent plates are similarly of opposite polarity. In this manner, the magnetic plates 96 establish magnetic fields across the inlet passage 95 to precipitate or remove the mineral particles from the wastes which are drawn in from the waste treatment container into the impeller housing thereby greatly minimizing the formation of scale within the impeller housing and aeration assemblies and enhancing their performance and efficiency. Each of the aeration assemblies 30' and 30' comprises an inner cone 50' and outer concentric cone 53' having a venturi-shaped throat region 54' which diverges into an expanded conical discharge portion 61' surrounded by a mixer tube 64', and a conduit 56' introduces air from the atmosphere through branch lines 59' and 60' through the wall of the cone 53' surrounding the nozzle 50'. In the form of FIGS. 9 and 10, the nozzle 50' and conical portion 53' have a common flange 62' for connection to each flange 93 at the discharge end of the impeller housing 90, the nozzle having a divergent or wider end adjacent to the flange 62' which is enlarged with respect to the discharge opening from the impeller housing 90, and the nozzle 50' converges away from the wider end to terminate in a narrow end or orifice 51' at the entrance to the venturi or throat region 54'. In this relation, the internal construction and operation of the individual aeration assemblies including the mixer tube 64' correspond to that of the embodiment of FIGS. 3 and 4; however, as noted earlier, the aeration assemblies 30' and 31' are connected directly to the annulus of the chamber or housing 38" outwardly of the impeller 38'. This relationship increases the flow capacity of the impellers in the discharge of waste directly from the impeller housing through the venturi-shaped conical inductors 53' whereby to generate a negative pressure condition across the venturi region 54' to draw the air into the stream of waste and to become entrained in the stream of waste in the form of air bubbles. These air bubbles are further divided as the stream is discharged into the mixer sleeves 64' and, in advancing through the mixer tubes, the intermixture of air and liquid waste will create a region of reduced pressure to cause recirculatory movement of the aerated stream discharged by each sleeve to further divide the air bubbles while maintaining the bubbles in the stream. This results in maximum aerobic digestion and hydrolization of the solid fines carried in the waste material.

As illustrated in FIG. 11, the method and apparatus of the present invention has been found to be particularly useful in the conversion of animal waste into animal feed values. Here, a submersible magnetic air inductor assembly as illustrated in FIGS. 9 and 10 is suspended from a platform P to rest at the bottom of a waste treatment lagoon L. Aerated liquid waste material from the lagoon is pumped through delivery line 110 to a waste confinement facility which typically may be a cattle barn or hog barn as illustrated at 112, the liquid waste material being employed as a flushing agent so as to carry animal wastes along gutters or flumes in the facility into a collector trough 111 and from which the waste-laden flush water can then be advanced via line 113 to a sump 114. The waste material is then pumped to one or more separator stages, for example, a shuttle-type separator 115 as set forth and described in my hereinbefore-referenced U.S. Pat. No. 4,338,337. This separator is capable of selectively removing a percentage of liquid and fines from the waste material to drain the same back into the lagoon L via return line 120. The larger solids which are collected from the separator stage may then be passed onto a conveyor and subsequently removed into a stacking area in the manner described in my U.S. Pat. No. 4,338,337. The magnetic air inductor assembly in the lagoon L is operative to induce air to flow from the surface through the aeration assemblies for intimate mixture with the liquids and solids making up the waste material whereby to recycle same throughout the lagoon and to circulate and uniformly distribute the air or oxygen in the form of micro-sized bubbles. In this way, the air is uniformly distributed throughout the liquid and fines recovered from the waste confinement facility so as to realize maximum aerobic digestion and hydrolization of the solid fines to convert them into single cell protein matter. Again, this material is recycled as flush water through the waste confinement facility for intermixture with additional wastes followed by separation of the moisture and fines in the separation stage and return of the digestible protein nutrients into the waste material lagoon. The larger solid materials and moisture not separated in the separation stage are then collected and stacked for use as feed supplement for the animals. The entire process of aeration, flushing and separation is preferably continuous and it is therefore extremely important that the process of aeration in the lagoon not be impeded or slowed by the collection or buildup of scale, particularly through the impeller and inductor regions of the assemblies.

It is therefore to be understood that various other modifications and changes may be made in the preferred and modified forms of invention as herein set forth without departing from the spirit and scope of the present invention as defined by the appended claims.

I claim:

1. In the method for conversion of animal waste material into useful feed values wherein the animal waste material is flushed from a collection area to a separation stage whereby to separate liquid waste and fines of a selected size from the animal waste material, the steps comprising:

advancing the separated liquid waste and fines from said separation stage to a waste treatment container;

pumping the separated liquid waste and fines in said container under pressure through a submerged aeration chamber and creating a magnetic field in association with said aeration chamber to remove magnetizable particles from the liquid waste and fines as they are pumped into the aeration chamber;

injecting air into the aeration chamber whereby to aerate the liquid waste and fines sufficiently to hydrolize the fines into single cell protein;

advancing the intermixed air, liquid waste and fines from said aeration chamber through an open-ended mixer tube whereby to induce the introduction of additional liquid waste and fines into said tube under the influence of the reduced pressure of the intermixed air, liquid waste and fines as it exits from said aeration chamber into said mixer tube; and recycling the liquid waste and single cell protein from the waste treatment container for flushing additional animal waste from the collection area to the separation stage for introduction of the single cell protein into the animal waste material.

2. The method according to claim 1, said magnetic field being created by a plurality of spaced magnetic members disposed at the inlet to said aeration chamber.

3. In apparatus for the conversion of animal waste in a confinement facility into useful feed values wherein said animal waste is flushed from the confinement facility with aerated liquid waste pumped from a waste treatment container and passed through a separation stage to remove moisture from the liquid waste together with solid fines contained in the liquid waste and the liquid waste and solid fines so removed being returned to said waste treatment container, a submersible air induction apparatus submerged in said waste treatment container for aeration of the liquid waste therein and hydrolization of the single cell protein in the fines present in the liquid waste so aerated, the combination therewith comprising:

impeller means having an inlet end and a discharge end and magnet means having an open-ended inlet passage sleeve normal to and in communication with said inlet end intermediately between opposite ends of said sleeve whereby to create a magnetizable field across said inlet end to remove magnetizable particles from the liquid waste and solid fines in said container which are drawn through opposite ends of said inlet passage sleeve by said impeller means, at least one injector assembly at said discharge end of said impeller means having first and second hollow, generally conical members, said first member having an injector inlet end receiving the liquid waste and fines under pressure from said discharge end of said impeller means and generally nozzle-shaped discharge means for discharge of the liquid waste and fines under pressure from a discharge end of said first member, said second member disposed in outer concentric surrounding relation to said discharge end of said first member including a venturi portion downstream of said first member continuing into an outwardly flowing expansion outlet, and air injecting means communicating with each said second member for introducing air into said second member, said discharge means creating a region of reduced pressure in said venturi portion to induce the flow of air from said air injecting means into and through said second member for intermixture with said liquid waste and fines whereby to aerate the liquid waste and fines sufficiently to hydrolize the fines into single cell protein, an elongated, open-ended, hollow sleeve including means mounting one end of each said sleeve in proximity to said expansion outlet whereby to direct the intermixture of air, fines and liquid waste from said expansion outlet through said sleeve and discharge said intermixture of air, fines and liquid waste through an opposite end of said sleeve into said waste treatment container, and means for recycling the liquid waste and single cell protein from the waste treatment container for flushing additional animal waste from the confinement facility to the separation stage for introduction of the single cell protein into the animal waste material.

4. In apparatus according to claim 3, said magnet means defined by a series of magnetic plates disposed at spaced intervals and extending parallel to the longitudinal axis of said inlet passage sleeve, said magnetic plates having opposed, flat vertical surfaces of opposite polarities across said inlet passage sleeve.

5. In apparatus according to claim 4, said impeller means having said inlet end communicating with said inlet passage sleeve, and mounted above said inlet passage sleeve, there being at least one injector assembly radiating outwardly in spaced circumferential relation to said impeller means, each said injector assembly having said inlet end in communication with said discharge end of said impeller means.

* * * * *